United States Patent

[11] 3,556,273

| [72] | Inventor | Paul Maucher |
| | | Neuweier, Baden, Germany |
| [21] | Appl. No. | 750,585 |
| [22] | Filed | Aug. 6, 1968 |
| [45] | Patented | Jan. 19, 1971 |
| [73] | Assignee | Luk Lamellen-und Kupplungsbau |
| | | Gesellschaft m. beschrankter Haftung |
| | | Buhl, Baden, Germany |
| [32] | Priority | Aug. 19, 1967 |
| [33] | | Germany |
| [31] | | L57,240 |

[54] CLUTCH DISC WITH VIBRATION DAMPENERS IN SERIES
8 Claims, 7 Drawing Figs.

[52] U.S. Cl..................................................... 192/106.2,
64/27
[51] Int. Cl................................................................ F16d 13/68
[50] Field of Search............................................ 192/106.1,
106.2, 55, 70.2, 107CP

[56] References Cited
UNITED STATES PATENTS

| Re22,635 | 4/1945 | Thelander.................... | 192/106.2X |
| 1,935,683 | 11/1933 | Wemp....................... | 192/106.1 |
| 1,991,436 | 2/1935 | Wemp....................... | 192/106.2 |
| 3,280,949 | 10/1966 | Ross............................ | 192/106.1X |
| 3,414,101 | 12/1968 | Binder et al. ................. | 192/106.2 |
| 3,428,155 | 2/1969 | Binder et al. ................. | 192/106.2X |

Primary Examiner—Benjamin W. Wyche
Attorney—Walter Becker

ABSTRACT: A clutch which includes hub means adapted to be positively connected for rotation with a shaft, and disc means having the plane thereof extending radially with regard to said hub means for receiving and supporting friction lining means, said hub means including means operable to establish a rotational elastically limited play between said disc means and said hub means.

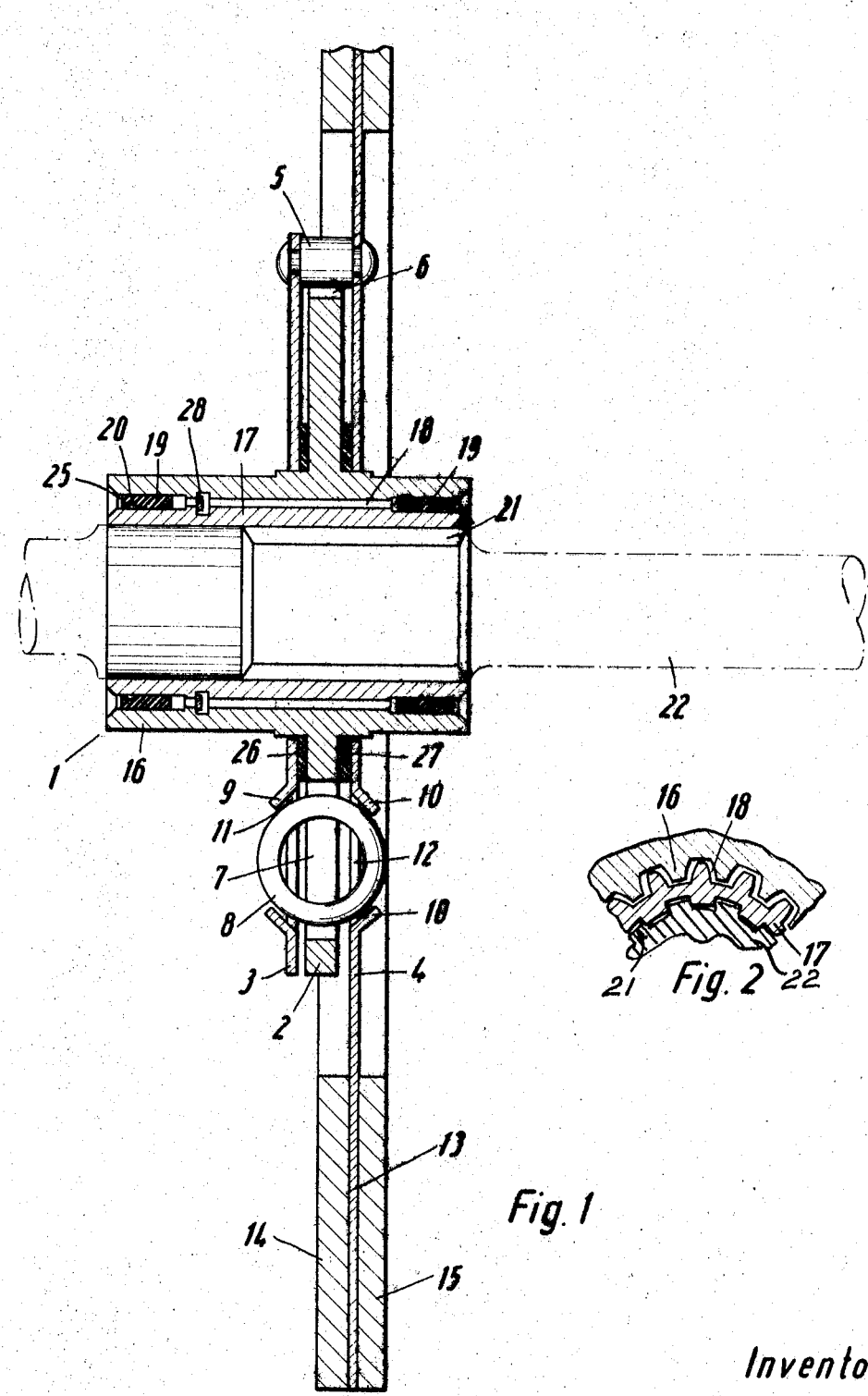

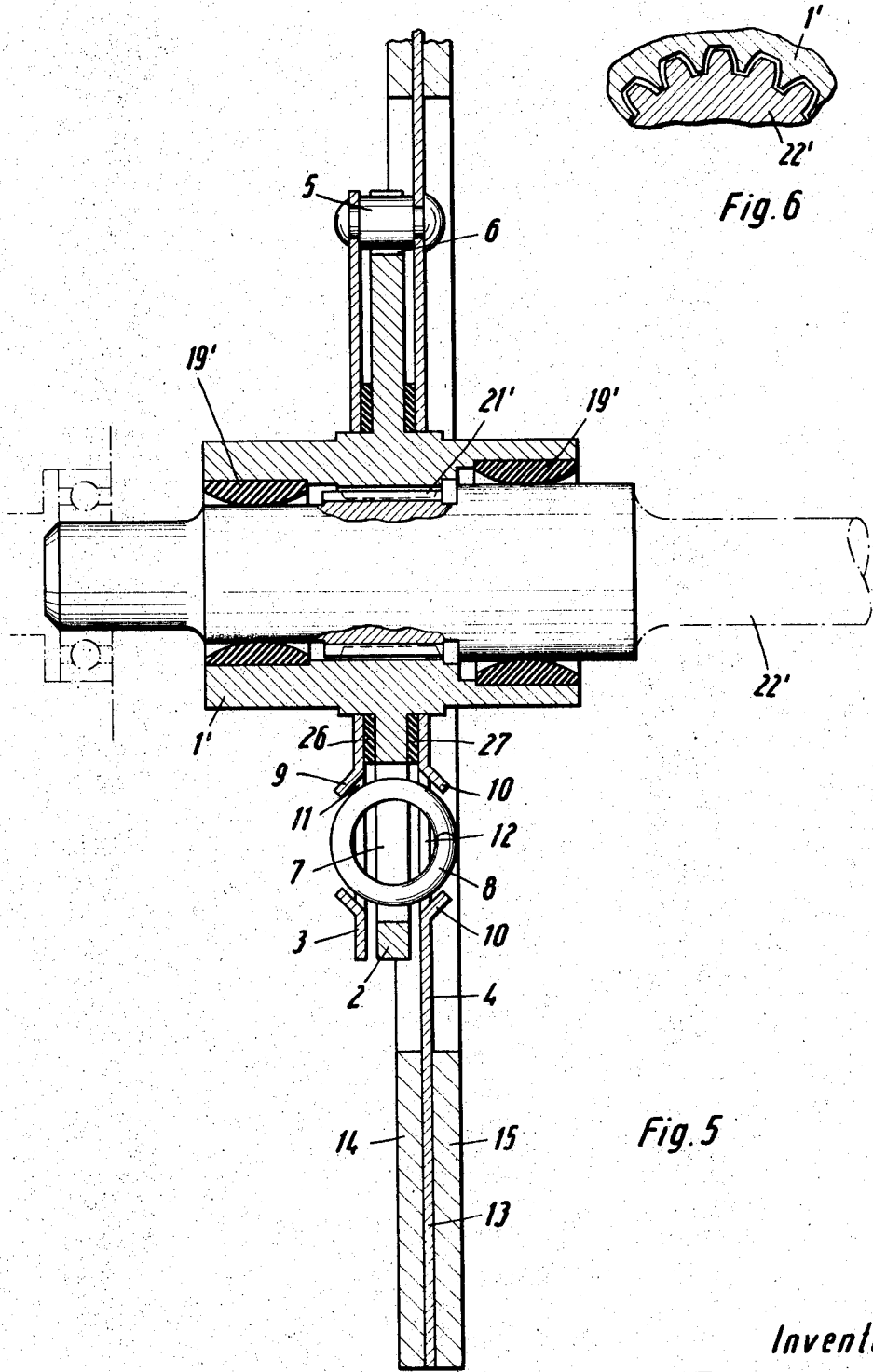

CLUTCH DISC WITH VIBRATION DAMPENERS IN SERIES

The invention pertains to a clutch disc, preferably with friction lining, which has a hub adapted to be positively rotatably connected to a shaft, e.g. the input shaft of a transmission, for example in the manner of a splined shaft connection, and in which preferably the friction lining carrier is rotatable in an elastically limited manner with regard to the hub by means of at least one spring or damping element.

A friction disc (German Pat. No. 882,779) has become known according to which in response to a fluctuation in the torque load, springs are loaded which are arranged inside window openings between the hub and the friction lining support. The torsional oscillations which might be produced in this connection are dampened by means of a friction brake or a damping device. While it is possible by means of such a damping device to cushion or dampen the alternating oscillations or vibrations, they cannot be completely eliminated so that the major disadvantage as encountered with a clutch disc without a damping device is still present. The characteristic of the vibration-damping increases constantly or progressively with the load moment. The disadvantage of these heretofore known clutch discs is seen in the fact that alternating vibrations are transmitted from these clutch discs for instance to a subsequent gear transmission whereby a so-called gear tooth flank changeover occurs which causes a clearly audible and annoying chattering noise combined with an increased wear of the tooth flanks. These alternating vibrations occur in particular during idling operations, that is in the lower r.p.m. ranges of the driving machine, for instance of an internal combustion engine, which latter when idling generally operates in a nonuniform manner.

It is an object of this invention so to design a clutch disc that alternating vibrations up to a certain predetermined amplitude will not be transmitted thereby.

It is a further object of this invention so to design a clutch disc that for a predefined angle of deflection around the zero position, no or only a negligible frictional damping will take place which will remain constant as to its magnitude.

Furthermore, with clutch discs with vibration damping it should be possible according to the invention, within adjacent angle ranges, to realize a damping with any desired characteristic.

In addition thereto, the clutch disc according to the invention should be simple in its construction and inexpensive to manufacture.

With a clutch disc, especially one with a friction lining, which has a hub adapted to be positively rotatably connected to a shaft, e.g. the input shaft of a transmission, by a splined shaft connection, and in which preferably the friction lining carrier is elastically rotatable to a limited extent relative to the hub by means of at least one spring or damping element, according to this invention, a torsional play is provided between the friction lining and the shaft. Because of this torsional play, the damping within its angular range is zero or constant so that alternating vibrations within this torsional play are not transmitted by the clutch disc and consequently a gear flank changeover in the individual gears of a subsequent transmission will be avoided.

According to another feature of this invention the torsional play is provided in a positive connection in the power path between the friction lining and the input shaft, preferably a gear transmission, in which the tooth spaces corresponding to the torsional play are larger than the thickness of the teeth, preferably in such a way that the torsional play equals the extended flank play. This results in a simpler construction of the clutch disc of this invention. However, it is also possible to provide the torsional play on two or more successive gear connections in such a manner that the sum of the individual flank plays or the like equals the total torsional play.

According to still another feature of this invention, for the purpose of achieving a constant damping within the region of the torsional play, the two parts which are connected together with a torsional play therebetween, are supported by at least one bearing, preferably a friction bearing, in such a manner that the bearing friction represents the constant damping within the region of the torsional play. By means of this friction bearing the frictional conditions can be accurately determined within the range of the torsional play, while if desired, the bearing may be made out of a material having a high coefficient of friction as for example a suitable synthetic material.

If however no or only a minimum damping is desired within the range of the torsional play, the parts which are joined to each other with a torsional play may rest against each other by means of at least one roller bearing. The damping action can further be improved by providing additional damping elements between the parts which have a torsional play therebetween.

For the purpose of achieving very small dimensions for a clutch disc according to the invention, the hub may be built up of two coaxial hub sections which are positively rotatably connected to one another, for example through gear means.

It is also possible to employ a friction bearing made of an elastic material and at the same time to provide this bearing with a sealing lip and a grease chamber.

The construction of the clutch disc according to the invention can be considerably simplified by providing the torsional play in the connection of the hub with the shaft, e.g. the transmission input shaft. If the hub is connected to the shaft for example by means of a splined shaft, the spline grooves are broader than the splines which engage them so that the clutch disc within the thus formed torsional play can be rotated without any or with only a constant damping relative to the shaft.

Generally speaking, the other features of this invention hold good also for this simplified version.

The invention is illustrated by way of example in the accompanying drawings, in which:

FIG. 1 shows an axial section through a clutch according to the invention.

FIG. 2 illustrates in cross section a portion of the teeth of both hub sections of the clutch disc.

FIGS. 5 and 6 illustrate still another modification of a clutch according to the invention, in which the hub is made as a single piece.

Figure 1A:
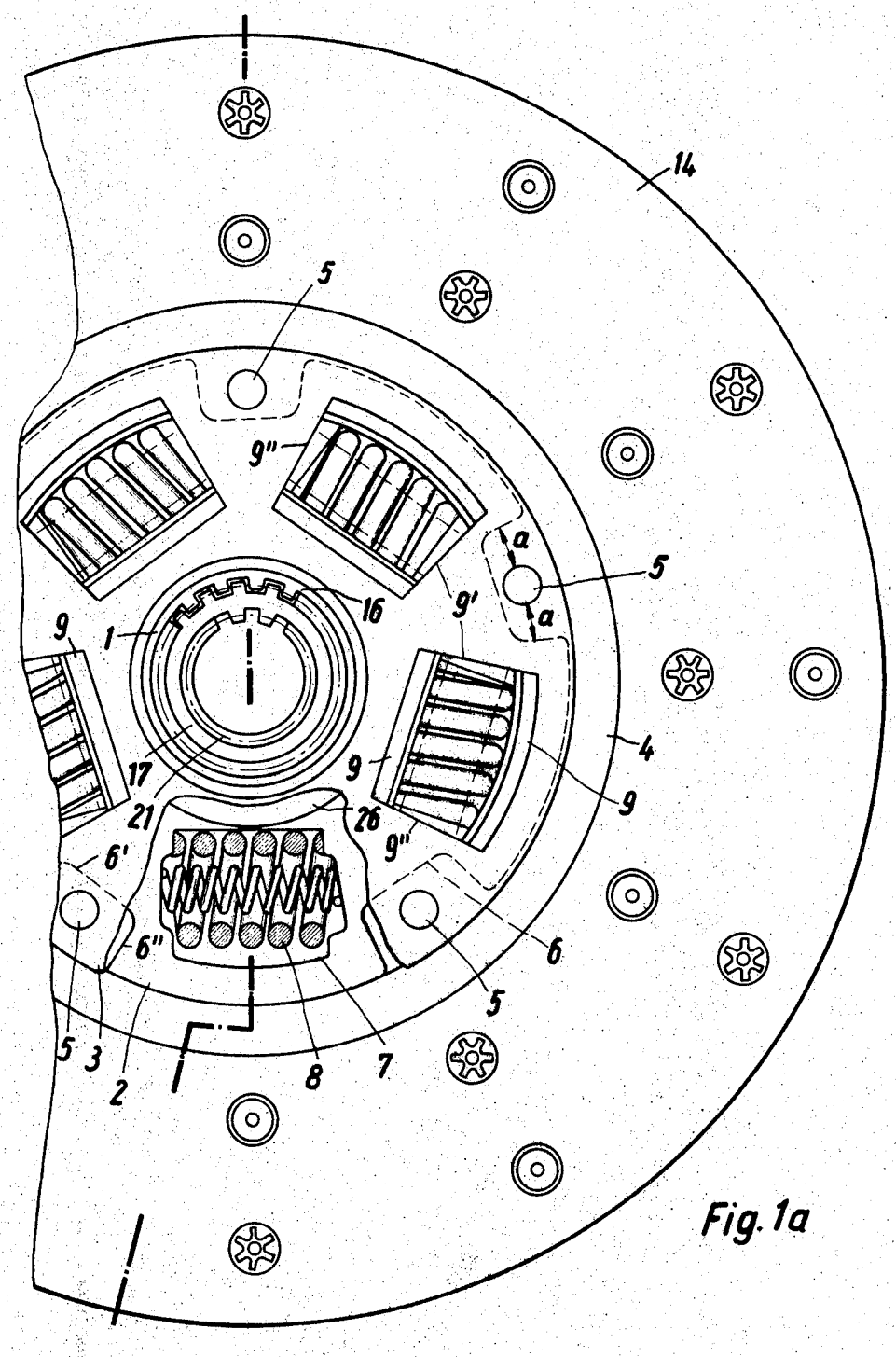
FIG. 1a is an axial view of FIG. 1.
Figure 3:
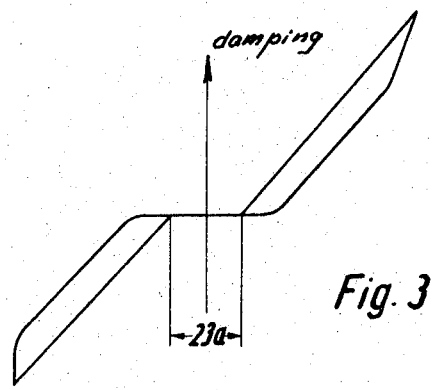
FIG. 3 shows the characteristic damping curve for a clutch disc according to this invention.

FIG. 1 shows a clutch disc according to the present invention which has a hub 1 the outer circumference of which is provided with an annular flange 2 located in a radial plane with regard to the hub. On both sides of the flange 2 and parallel thereto there are located spring guide plates 3,4 which are joined to each other by means of rivets 5 near the flange circumference, said rivets being under preload in axial direction thereof. These rivets are located in corresponding recesses 6 around the periphery of the flange 2. The recesses or cutouts 6 are so large that between hub 1 and the spring guide plates 3,4 a swinging movement is possible. As the case may be, when rivets 5 abut the corresponding walls of the recesses 6, a positive driving connection is established between flange 2 and the spring guide plates 3,4.

The flange 2 of hub 1 is provided with windows 7 which are uniformly distributed over the periphery and in which approximately tangentially extending helical compression springs 8 are arranged. These springs 8 are supported by means of tabs 9,10 stamped out of the spring guide plates 3,4. One end of each helical compression spring 8 rests against the inner surface of the window 7 of the flange 2 and the other end presses against both the inner surfaces of the openings 11,12 in the spring guide plate 3,4.

Both the spring guide plates 3,4 lie axially displaced from the flange 2 of the hub 1 so that in the annular spaces thus formed at least one disc 26 or 27 each is arranged as a damping element and by means of its plane surfaces rest on one hand against flange 2 and on the other hand against the inner surface of the spring guide plate 3 or 4 pertaining thereto. The damping discs 26 or 27 may be formed out of a suitable frictional material, such as synthetic material or metal. For instance, the damping discs 26 or 27 could be made of a mixture of the material sold under the trademark Buna and metal, or could be made of the same material as the friction lining 14,15. If desired, the damping discs may also be made of spring band steel.

The oscillating movements of the spring guide plates 3,4 relative to the flange 2 are dampened by means of the said damping discs 26 or 27.

The outer annular zone 13 of one of the spring guide plates 3,4 is employed as a carrier for friction linings 14,15 respectively arranged on opposite sides of the friction ring carrier 13 and connected thereto for example by means of rivets, cement and similar substances.

Hub 1 of the clutch disc according to the invention comprises two sleeve-shaped hub parts 16,17 coaxially arranged one within the other, the external part being connected to the hub flange 2. Both hub sleeves 16,17 are connected to each other by means of teeth 16,18 in conformity with FIG. 2, said teeth 18 being provided in the central region between the two ends of the hub 1. According to the particular showing in the drawing, an axial tooth design is provided. However, it is also possible to design these teeth as beveled or inclined teeth. The teeth 18 have a torsional play corresponding to an angle of preferably between 2° and 8°, which is formed by a corresponding flank play. Friction bearings 19 are provided between the hub parts 16,17 on both sides of the teeth and near the ends of the hub 1. These friction bearings have their internal surfaces provided with annular groove-shaped grease chambers 20 according to the specific example shown.

The inner hub sleeve 17 has its inner periphery provided with teeth 21 which correspond to the teeth of the splined transmission input shaft 22 indicated in dot-dash lines. The teeth 21 are such that the internal hub sleeve 17 is nonrotatable on said input shaft 22 but is axially displaceable thereon.

It will be appreciated that during a turning movement of flange 2 relative to plates 3,4 or friction linings 14,15, springs 8 in windows 7 abut the lateral surfaces 9', 9'' (FIG. 1a) of the openings 11,12 of plates 3,4 so that springs 8 are compressed in axial direction. As a result thereof, a jerky torque transmission from friction linings 14,15 or plate 4 to transmission shaft 22 and vice versa will be avoided which means that said springs 8 exert the temporary damping effect. The damping stroke is limited by the maximum permissible spring stroke of springs 8 and by the lateral confining surfaces 6', 6''(FIG. 1a) in the cutouts 6 in flanges 2, so that in both directions of rotation a damping stroke $a$ is obtained (FIG. 1a).

The radial inner portion of each spring-guide guide plate 3,4 is mounted on flange 6 with a slight radial play, the plates 3,4 being held in their mounted position by rivets 5. The plates 3,4 are rotatable on the hub to a limited extent only and, more specifically, to the extent to which the cutouts 6 or flange 2 permit such rotation.

The damping discs 26,27 are likewise loosely mounted on flange 2. By means of the damping discs 26,27, oscillating movements of the plates 3,4 in the direction of rotation are dampened relative to the flange 2. In this connection it is substantially immaterial whether the damping friction during the oscillatory movement of the plates 3,4 is effected relative to the flange 2 between the damping discs and the flange or between the damping discs and the spring guide plates 3,4.

The outer annular zone 13 of one of the spring guide plates 3,4 is employed as a carrier for friction linings 14,15 respectively arranged on opposite sides of the friction ring carrier 13 and connected thereto for example by means of rivets, cement, or similar substances.

Figure 4:
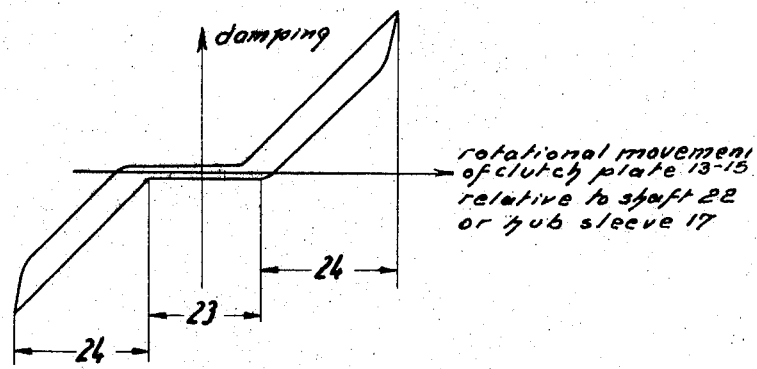
FIG. 4 represents the characteristic damping curve for a modified clutch disc according to the invention.

The clutch disc according to FIG. 1 has a damping characteristic as shown in FIG. 4. Within the range of the rotational play of the friction linings 14,15 relative to the shaft 22, as caused by the play of the flanks of teeth 18 and corresponding to region 23 of the characteristic curve in FIG. 4, the damping is relatively small and constant. The damping depends on the friction of the selected bearing material of the bearing 19 between the hub sleeves 17,16. A considerably higher damping prevails in the neighboring angular ranges of the rotary motion of friction linings 14,15 with regard to the shaft 22, in which ranges the flanks of the teeth 18 lie against each other, and which are represented by the region 24 of the characteristic of FIG. 4.

As indicated in FIG. 5, if desired, no damping may be provided in the region 23a of the rotational play of the friction linings 15,14 with regard to the shaft 22. This is achieved for example by journaling both hub sleeve sections 16,17 upon each other through the intervention of practically frictionless roller bearing means or similar things.

As shown in FIG. 1, the friction bearings 19 can be provided with sealing lips 25 for sealing the grease chambers 20 in the arrangement of FIG. 1.

The hub sections 16,17 are secured against axial displacement relative to each other for example by a spring ring 28.

According to the embodiment of the invention shown in FIGS. 5 and 6, the hub 1' is shown as a single integral piece while the rotational play has been provided in teeth 21' between the hub 1' and the gear transmission input shaft 22'. The bearings 19' are friction bearings.

It is, of course, to be understood that the present invention is, by no means, limited to the specific designs shown in the drawings but also comprises numerous modifications, the scope of the invention being determined by the scope of the appended claims.

I claim:

1. A clutch which includes: disc means for receiving and supporting friction means, a two-part hub having an inner part adapted to be positively connected for rotation with a shaft, and an outer part connected to said disc means by circumferentially yielding resilient means, said hub including driving means operable to establish an angularly limited rotational play between said parts, said hub parts having radially spaced, circumferential, axially extending surfaces, and annular friction bearing means interposed between and in contact with said circumferential, axially extending surfaces and having frictional slidable contact with at least one of said surfaces to provide frictional resistance to circumferential relative movement of said friction bearing means and at least one of said surfaces so that said rotational play is free of any returning force.

2. In a clutch as claimed in claim 1, said friction bearing means comprising friction bearing members on opposite sides of the plane of said disc means between said hub parts.

3. A clutch according to claim 2, in which the outer periphery of the inner hub part and the inner periphery of the outer hub part are provided with intermeshing teeth forming said driving means with said teeth on the inner and outer hub parts spaced to provide said rotational play.

4. A clutch according to claim 1 in which said rotational play is within the range of 2° to 8°.

5. A clutch according to claim 1 in which said friction bearing means are of elastic material.

6. A clutch according to claim 1, in which said friction bearing means includes sealing means and grease chamber means.

7. A clutch according to claim 1, which includes at least two bearings respectively arranged at the ends of the two hub parts, the intermeshing teeth and tooth spaces of said hub parts being located between said bearing means.

8. A clutch according to claim 1, in which said rotational free play is within an angular range of from 2° to 8°.